United States Patent [19]
Actis et al.

[11] Patent Number: 5,837,983
[45] Date of Patent: Nov. 17, 1998

[54] READABILITY MONITORING SYSTEM FOR OPTICAL CODES

[75] Inventors: Robert J. Actis; Craig D. Cherry; Alan C. Bradley, all of Eugene, Oreg.; Donald D. Dieball, San Diego, Calif.

[73] Assignee: PSC, Inc., Eugene, Oreg.

[21] Appl. No.: 661,129

[22] Filed: Jun. 10, 1996

[51] Int. Cl.$^6$ ...................................................... G06K 5/00
[52] U.S. Cl. ........................... 235/437; 235/462; 235/383
[58] Field of Search ..................................... 235/437, 438, 235/462, 383

[56] References Cited

U.S. PATENT DOCUMENTS

| | | | |
|---|---|---|---|
| Re. 35,117 | 12/1995 | Rando et al. | 235/375 |
| 4,879,456 | 11/1989 | Cherry et al. | 235/462 |
| 4,939,355 | 7/1990 | Rando et al. | 235/467 |
| 5,144,118 | 9/1992 | Actis et al. | 235/462 |
| 5,334,825 | 8/1994 | Maddox | 235/437 |
| 5,493,108 | 2/1996 | Cherry et al. | 235/454 |
| 5,504,315 | 4/1996 | Hardesty et al. | 235/437 |

*Primary Examiner*—F. L. Evans
*Attorney, Agent, or Firm*—Lyon & Lyon LLP

[57] ABSTRACT

An apparatus and method for monitoring and reporting optical symbol readability and operator and reader performance levels. The apparatus includes a reader for optical symbols which measures and reports the values of measurements with respect to the symbol and events occurring during the reading process indicative of the label readability. The apparatus further comprises data accumulation device including a memory storage to accumulate these measurement values for each set of labels, and a programmed computing system to analyze the measured values and report on the results of the analysis. A preferred method of monitoring and reporting optical symbol readability and operator and reader performance levels includes the steps of reading or attempting to read an optical symbol, performing measurements within the symbol and noting events during the reading process, accumulating these values, analyzing the accumulated data, and producing a report which lists the sets of labels which had readability problems. The method also includes the optional step of listing the reading devices and reader operators which had more problems in reading symbols than expected.

28 Claims, 9 Drawing Sheets

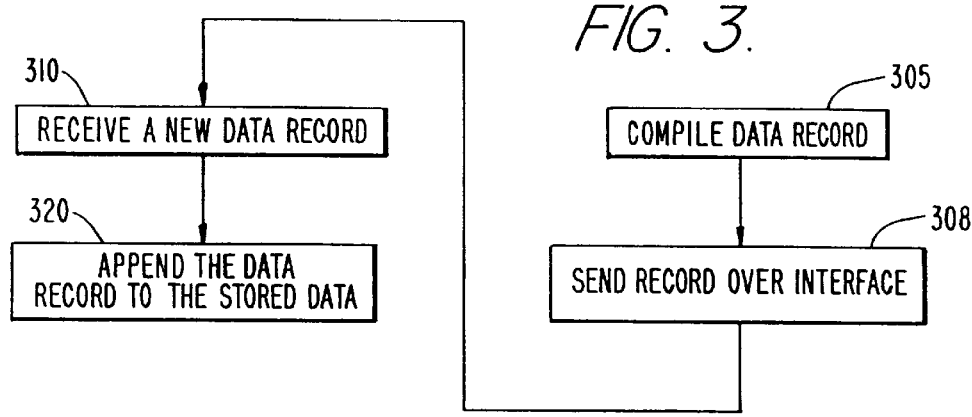
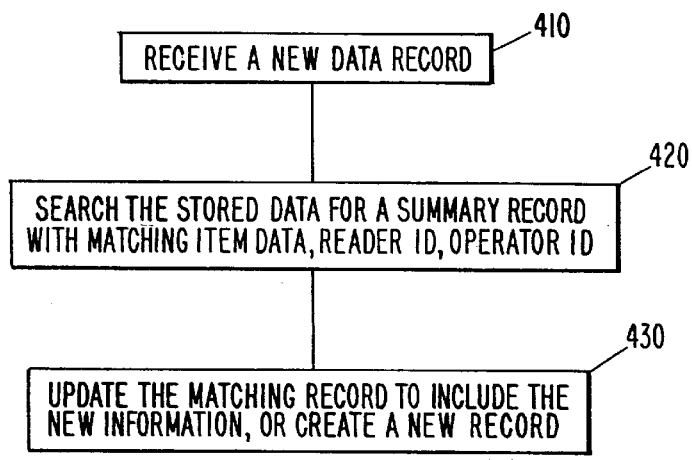
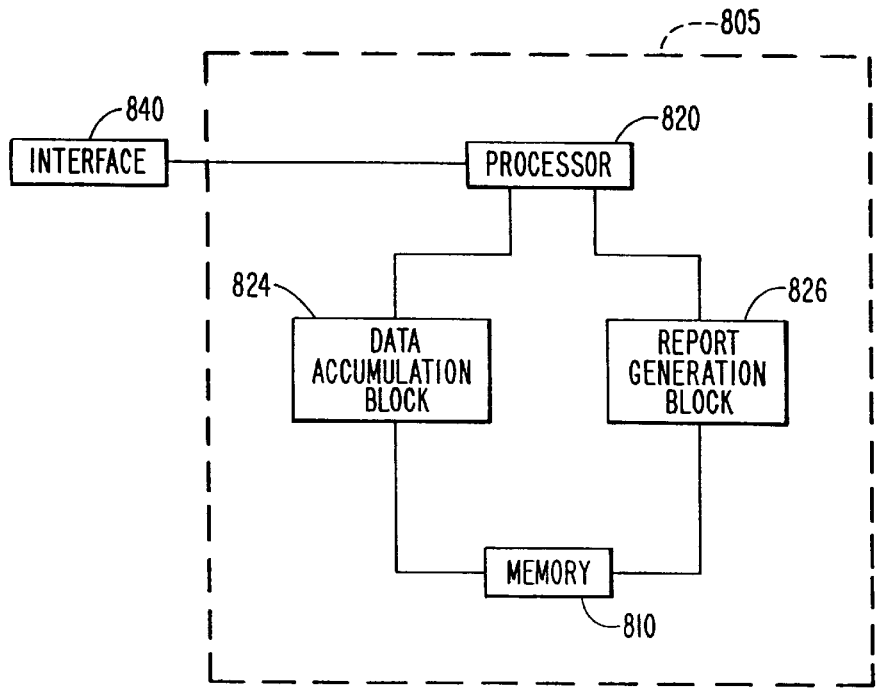

| SIZE | FIELD CONTENTS | |
|---|---|---|
| 13 DIGITS | UPC / EAN / LABEL DATA | —602 |
| 3 DIGITS | READER ID / LANE ID | —603 |
| 4 DIGITS | OPERATOR ID | —604 |
| 3 DIGITS | OPTICAL CONTRAST VALUE | —605 |
| 3 DIGITS | OVER/UNDERPRINT VALUE | —606 |
| 1 CHARACTER | QUIET ZONE OK? | —607 |
| 3 DIGITS | MODULATION VALUE | —608 |
| 1 CHARACTER | CHARACTER DECODABILITY | —609 |
| 3 DIGITS | CAPTURE RATE | —610 |
| 3 DIGITS | TIME TO READ | —611 |
| 3 DIGITS | DATA VARIATION | —612 |

*FIG. 6.*

| SIZE | FIELD CONTENTS | |
|---|---|---|
| 3 DIGITS | READER ID / LANE ID | —802 |
| 4 DIGITS | OPERATOR ID | —803 |
| 6 DIGITS | NUMBER OF NON-READ EVENTS SEEN | —804 |

*FIG. 8.*

| SIZE | FIELD CONTENTS | |
|---|---|---|
| 13 DIGITS | UPC / EAN / LABEL | 702 |
| 3 DIGITS | READER ID / LANE ID | 703 |
| 4 DIGITS | OPERATOR ID | 704 |
| 6 DIGITS | NUMBER OF TIMES THAT THIS SYMBOL DATA WAS READ | 705 |
| 3 DIGITS | AVERAGE OPTICAL CONTRAST | 706 |
| 6 DIGITS | NUMBER OF TIMES THAT OPTICAL CONTRAST WAS OUT OF SPEC. | 707 |
| 3 DIGITS | AVERAGE OVER / UNDERPRINT | 708 |
| 6 DIGITS | NUMBER OF TIMES THAT OVER / UNDERPRINT WAS OUT OF SPEC. | 709 |
| 6 DIGITS | NUMBER OF TIMES THAT QUIET ZONE WAS OUT OF SPEC. | 710 |
| 3 DIGITS | AVERAGE MODULATION VALUE | 711 |
| 6 DIGITS | NUMBER OF TIMES THAT MODULATION WAS OUT OF SPEC. | 712 |
| 3 DIGITS | AVERAGE CHARACTER DECODABILITY | 713 |
| 6 DIGITS | NUMBER OF TIMES DECODABILITY WAS OUT OF SPEC. | 714 |
| 3 DIGITS | AVERAGE CAPTURE RATE | 715 |
| 6 DIGITS | NUMBER OF TIMES THAT CAPTURE RATE WAS OUT OF SPEC. | 716 |
| 4 DIGITS | AVERAGE TIME TO READ | 717 |
| 6 DIGITS | NUMBER OF TIMES THAT TIME TO READ WAS OUT OF SPEC. | 718 |
| 3 DIGITS | AVERAGE DATA VARIATION | 719 |
| 6 DIGITS | NUMBER OF TIMES THAT DATA VARIATION WAS OUT OF SPEC. | 720 |

POS QUALITY REPORT  9/9/99 THROUGH 9/16/99

PRODUCT READABILITY PROBLEMS:    WORST 1%

IN-STORE PRINTED LABELS : STORE 45

| DEPARTMENT | ITEM CODE | AVG. READABILITY | NUMBER READ | COMMENTS |
|---|---|---|---|---|
| MEAT | 12345 | 14 | 4596 | |
| | 22221 | 21 | 203 | READABILITY WAS 12.2 IN PREVIOUS REPORT |
| | DEPT. TOTAL | 14.3 | 4799 | |
| DELI | 43001 | 25 | 371 | READABILITY WAS 22 IN PREVIOUS REPORT |
| | DEPT. TOTAL | 25 | 371 | |

PRE-PRINTED LABELS : ALL STORES

| MFG. ID | ITEM CODE | AVG. READABILITY | NUMBER READ | COMMENTS |
|---|---|---|---|---|
| 0123456 | 00112 | 32 | 5501 | |
| | MFG. TOTAL | 68 | 132,450 | READABILITY WAS 72 IN PREVIOUS REPORT |
| 1423433 | 99922 | 8 | 5 | |
| | 99935 | 21 | 1902 | |
| | MFG. TOTAL | 32 | 45,790 | READABILITY WAS 30 IN PREVIOUS REPORT |

READER PERFORMANCE ALERT

| STORE | LANE | AVG. READABILITY | COMMENTS |
|---|---|---|---|
| 45 | 2 | 52 | READABILITY WAS 67 IN PREVIOUS REPORT |
| 45 | 5 | 35 | AVERAGE FOR STORE 45 IS 58 |

OPERATOR PERFORMANCE ALERT

| OPERATOR | STORE | AVG. READABILITY | COMMENTS |
|---|---|---|---|
| 251 | 45 | 85 | AVERAGE FOR STORE 45 IS 58 |
| 347 | 45 | 32 | WAS 48 IN PREVIOUS REPORT |

READABILITY MONITORING SYSTEM FOR OPTICAL CODES

FIELD OF THE INVENTION

The field of the present invention relates to monitoring techniques for systems employing optical codes and, more specifically, to measuring, reporting and correcting suboptimum performance in automatic data entry systems utilizing optical codes.

COPYRIGHT NOTICE

A portion of the disclosure of this patent document contains material which is subject to copyright protection. The owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

In a wide variety of applications, encoded symbols bearing information are affixed to products, labels, packages and the like. The encoded symbols may be optically read with reading equipment, either manually or automatically, and decoded to recover the encoded information.

Performance deficiencies in reading optical codes may result from any of several causes, such as poor quality optical code symbols, improper use of the reading equipment, or degraded performance in the reading equipment. These performance deficiencies can occur regardless of whether the optical code symbols are printed or otherwise produced on the premises where they are to be read, or instead preprinted by the supplier of the item which is marked with the symbol.

There are several conventional methods which attempt to monitor optical code readability. A first conventional method, for example, requires the operator of the reading equipment to observe that a symbol is more difficult to read than should be expected. If some pattern or trend is noticed indicating poor readability of labels from certain suppliers or on certain items, or poor readability of labels from certain printing devices on the premises, or poor operation of a reading device, the operator must report the problem, usually by filling out a form provided for such a purpose. The form is then sent to another individual, who is responsible for collating the information and asking the responsible parties to take action to remedy the symbol quality problem, or to repair the reading equipment.

There are several drawbacks to this method of monitoring the reading equipment. First, because the adequacy of performance of the reading equipment is decided subjectively by the operator, results are likely to be inconsistent from one operator to another. Also, since the monitoring and reporting technique is a manual process, the operator must take time to note the problems seen, and then fill out the necessary forms. Because of the time and effort needed to report problems, it is possible that the operator will only report the most serious problems, and may not report slightly marginal symbol readability or reader performance, although productivity and accuracy are being adversely affected. A particular operator is likely to only notice problems with symbols which are on items which are read in high volume, and not notice or report problems on less common items. For example, in a grocery store, a problem reading a commonly sold item such as milk would probably be noticed quickly, but a problem reading some less common item may not be reported.

Another conventional method for monitoring symbol quality makes use of special symbol quality measurement devices, also called label verifiers. A label verifier measures certain characteristics of an optical symbol, and rates the readability of the label based on the level of compliance with standards for label characteristics. A widely used standard is ANSI X3.182-1990 "Bar Code Print Quality Guideline". The Uniform Code Council, Inc. publishes a similar specification for the UPC code used in grocery stores, in the "UPC Symbol Specification Manual". A typical procedure for using a label verifier would be to randomly select some sample items, and then use the label verifier to test the symbol quality.

This procedure also has its drawbacks. Label verifying in the described manner requires special equipment and the time and expense of an additional reading process dedicated solely to find defective symbols, making this method impractical for many applications. Label verifiers, especially lower cost units, often provide inconsistent results from a given symbol, requiring the use of multiple measurements or a larger sample size. Since the design of the label verifier generally differs from the design of the normal symbol reading equipment, the label verifier may be overly conservative in its measurement, resulting in unnecessary efforts to improve symbols which actually would read well on the normal equipment, or contrawise, the label verifier may be overly permissive, and not recommend improving labels which are not easily read on the normal equipment. Also, the label verifier method only addresses the issue of poor symbol quality, and does nothing to detect faulty operation of the normal reading equipment itself, or poor operator technique in using the normal reading equipment.

In yet another conventional method, the ordinary reading equipment measures the quality of each symbol as it is being read, and reports the quality of the symbol to a central computer. This method can potentially result in the reporting of differing label quality values each time a given symbol is read, because of differences in the orientation and movement of the item relative to the reader, especially when the items are being manually scanned by the operator. Different quality values can also be reported for the same symbol because of differences from one reading device to another. It is generally undesirable to have differing quality ratings for the same symbol.

SUMMARY OF THE INVENTION

The present invention in one or more aspects provides an apparatus and method for monitoring and reporting optical symbol readability.

In one embodiment, an apparatus for monitoring and reporting optical symbol readability and operator and reader performance levels includes a reader for optical symbols which measures and reports the values of measurements within the symbol and events during the reading process indicative of the label readability. The apparatus further comprises a data accumulation device including a memory storage portion to accumulate the measurement values for each set of labels, and a programmed computing system to analyze the measured values and report on the results of the analysis. The data accumulation function and report generation function are preferably integrated into a single device which is connected to a plurality of optical code readers for the purpose of monitoring the performance of the readers, the performance of the operators of the readers, and the readability of the optical symbols.

A preferred method of monitoring and reporting optical symbol readability and operator and reader performance levels includes the steps of reading or attempting to read an optical symbol, performing measurements within the symbol and noting events during the reading process, accumulating these values, analyzing the accumulated data, and producing a report which lists the sets of labels which had readability problems. The method also includes the optional step of listing the reading devices and reader operators which had more problems in reading symbols than expected.

BRIEF DESCRIPTION OF THE DRAWINGS

The various objects, features and advantages of the present invention are fully explained in the detailed description of the preferred embodiments of the invention found below, together with the figures, wherein:

FIG. 3 is a flow chart showing a preferred process of accumulating readability data while symbols are being read.

FIG. 4 is a flow chart showing an alternate method of accumulating readability data while symbols are being read.

FIG. 6 is a diagram illustrating the contents of a symbol readability data record for an exemplary grocery store system.

FIG. 7 is a diagram illustrating the contents of an alternative symbol readability data record.

FIG. 8 is a diagram of a non-read data record for an exemplary grocery store system.

FIG. 9 is a diagram of a readability analysis report for an exemplary grocery store system.

FIG. 10 is a block diagram of a preferred measurement data accumulation and report generation apparatus.

DETAILED DESCRIPTION OF THE PREFERRED EMBODIMENT

Figure 1:
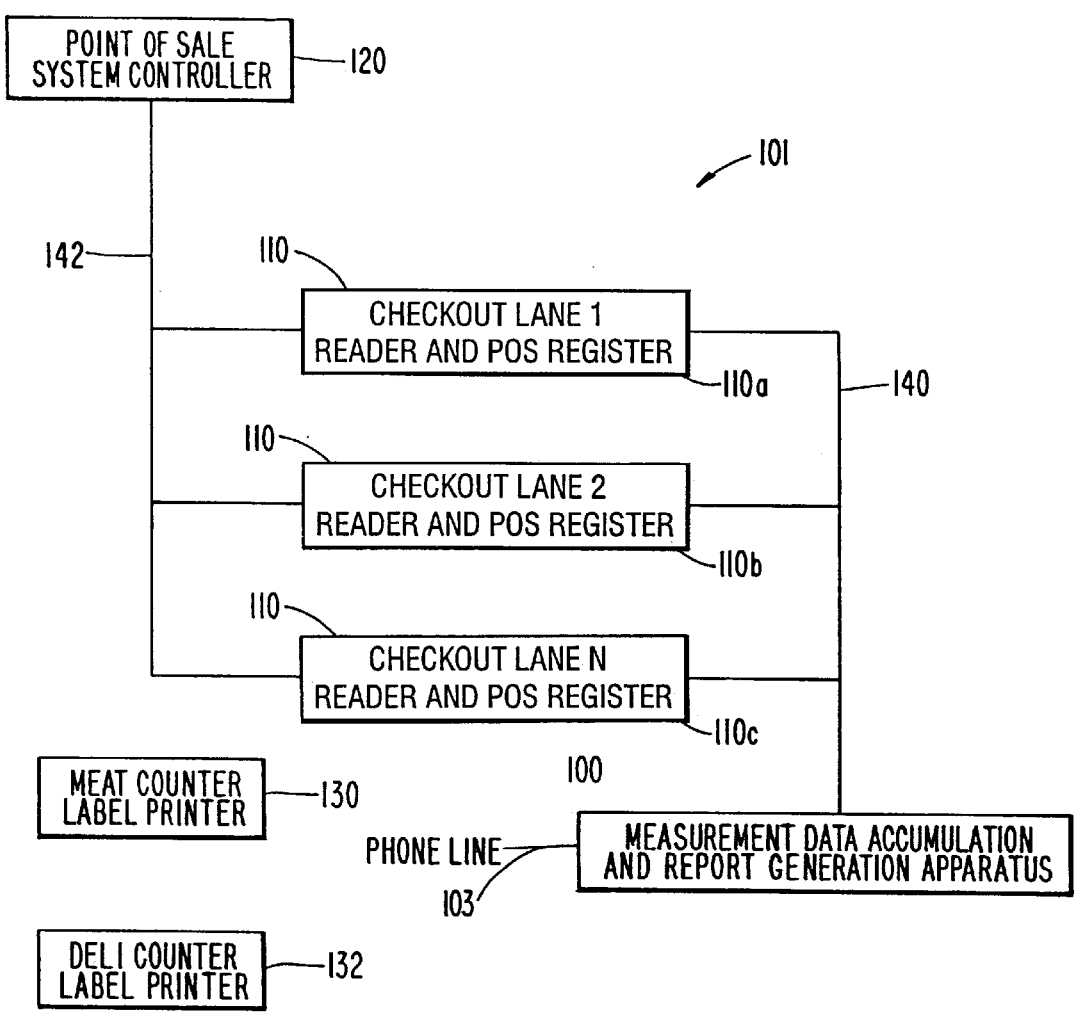
FIGS. 1 and 1A are block diagrams of an exemplary system in accordance with one or more aspects of the invention configured to operate a grocery store or similar retail environment.

FIG. 1 is a block diagram of an exemplary optical code readability monitoring system 101 in accordance with one or more aspects of the invention, configured to operate a grocery store or similar retail environment.

The optical code readability monitoring system 101 preferably includes multiple optical code readers 110 such as optical code readers 110a–c depicted FIG. 1. The optical code readers 110 are connected across an interface 140 to a measurement data accumulation and report generation apparatus 100. The optical code readers 110 are connected across another interface 142 to a point of sale system controller 120.

Figure 1A:
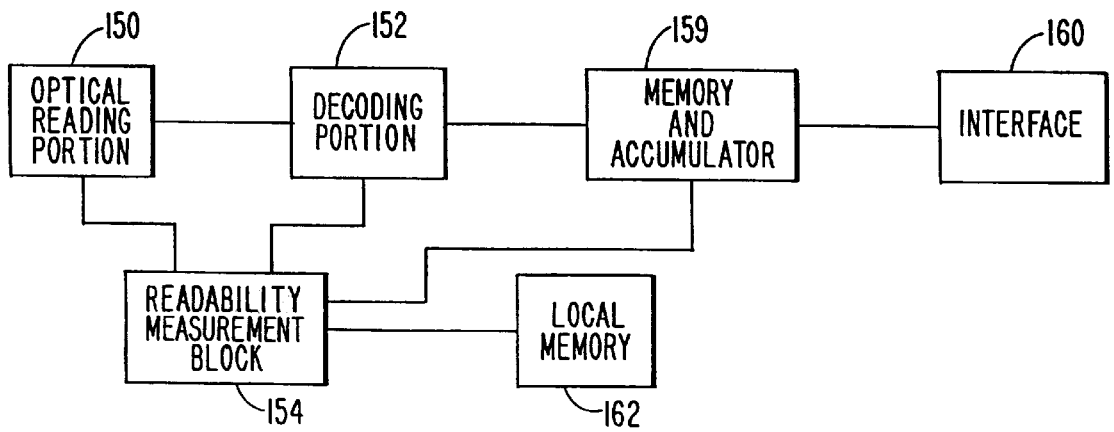

The optical code readers 110 of FIG. 1 each include any conventional or suitable symbol reading and decoding apparatus as is well known in the art. For example, as shown in FIG. 1A, the optical code readers 110 may include as an optical reading portion 150 a laser scanning optical system as described in U.S. Pat. No. 5,475,207, or a CCD reading apparatus such as described in U.S. Pat. No. 5,446,271, each of which patents are assigned to the assignee of the present invention and hereby incorporated by reference as if set forth fully herein. As depicted in FIG. 1A, the optical code readers 110 preferably include a local decoding portion 152 connected to the optical reading portion 150.

The optical code readers 110 also each include a readability measurement functional block 154 comprising, as described in more detail hereafter, means for measuring data indicating the readability of optical codes read during each pass of items bearing such codes. The readability measurement functional block 154 utilizes the standard sensing and computing apparatus customarily used in optical code readers, and further comprises additional circuitry or software, or both, to provide the additional measurement functions as described herein.

A memory and accumulator 159 is connected to the decoding portion 152 and the readability measurement functional block 154. A local memory 162 may also be connected to the readability measurement functional block 154.

An interface means 160 is connected to the optical code reader 110, or is integral therewith, for transmitting the readability measurements to a measurement data accumulation and report generation apparatus 100. The interface means 160 is connected to the memory and accumulator 159, and takes readability measurements therefore to report to the measurement data accumulation and report generation apparatus 100. The interface means 160 preferably comprises low cost point-to-point or multidrop data communications devices, such as EIA-232 or EIA-485 lines, or local area network devices such as 10-Base T twisted pair, or Ethernet devices. In an alternate embodiment using standard data telecommunications techniques, portions of the apparatus shown in FIG. 1 can be located in various geographical locations as desired, using data links to interconnect the devices.

A block diagram of a preferred measurement data accumulation and report generation apparatus 100 is depicted in FIG. 10. In a preferred embodiment, the measurement data accumulation and report generation apparatus 100 has an interface 840 to receive data from the optical code readers 110 such as shown in FIG. 1. The measurement data accumulation and report generation apparatus 100 preferably comprises a general purpose computer 805 with sufficient processing power and memory to perform the operations and functions described herein.

The measurement data accumulation and report generation apparatus 100 comprises a memory 810 (which may be the same memory as associated with the general purpose computer 805) to store the data records, examples of which are shown in FIGS. 6, 7 and 8 and described in more detail hereafter. The memory 810 for storing data records within the measurement data accumulation and report generation apparatus 100 may be implemented in any of several forms, including magnetic disk memory, or semiconductor RAM, depending on the amount of memory needed for a particular application, and the desired system performance and cost. The measurement data accumulation and report generation apparatus 100 further includes a processor 820 connected to the memory 810 and to the interface 840, to perform the preferred measurement accumulation and report generation functions described hereinafter.

The measurement data accumulation and report generation apparatus 100 optionally has means to identify the optical code reader 110 sending the data, and optionally includes means to identify the operator of the optical code reader 110. For example, each optical reader 110 may be identified by a unique identification number, and each operator may likewise be assigned an operator identification number that is entered prior to the operator's use of a particular optical code reader 110. The optical code reader identification information and operator identification information may be maintained either within the optical code readers 110 themselves, or within the measurement data accumulation and report generation apparatus 100, as is most convenient.

The measurement data accumulation and report generation apparatus 100 includes a data accumulation function block 824 and a report generation function block 826 as shown in FIG. 10. The data accumulation function block 824 and the report generation function block 826 may be embodied as software resident in the measurement data accumulation and report generation apparatus 100.

Figure 2:
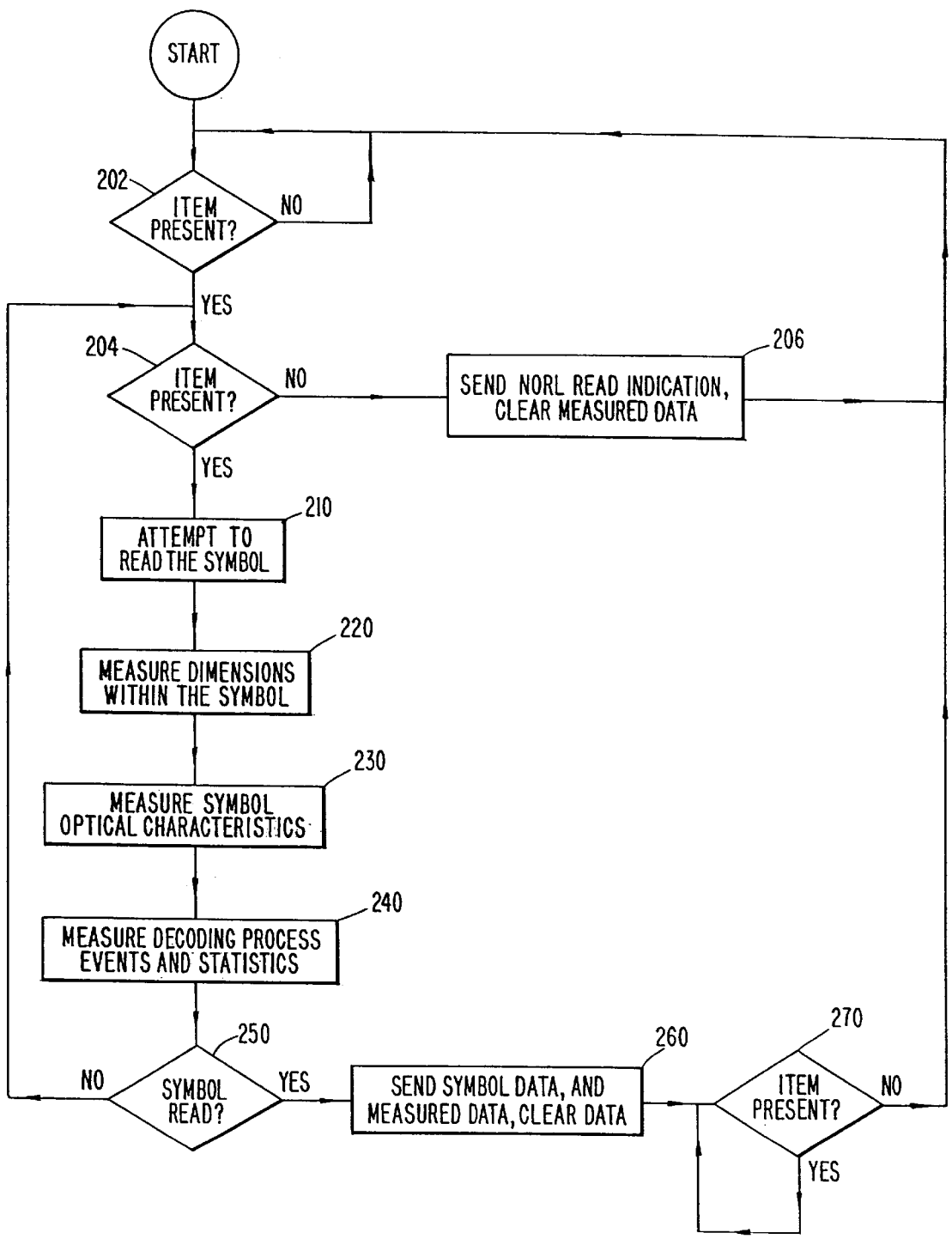
FIG. 2 is a flow chart showing a preferred process of measuring readability data during the symbol reading operation.

In a preferred embodiment, the optical code readers 110 perform data gathering and supply data information to the measurement data accumulation and report generation apparatus 100. FIG. 2 is a flow chart illustrating a preferred symbol measurement and optical code information gathering method. In the FIG. 2 flow chart, measurement of optical code features and generation of pertinent monitoring information occurs at several stages of the reading and decoding process. In an initial step 202, a test is made to determine if an item bearing an optical code is present. Such a test is preferably performed by detecting the presence of data which is indicative of a potentially valid optical code within the field of view of the optical code reader 110 within some time period (whether such period is predefined or manually triggered). Alternatively, a test for the presence of an item bearing an optical code may be performed by using some other type of sensing means, such as a detector which detects the blocking of an optical beam, or an ultrasonic or radar proximity sensor.

After an item bearing an optical code is initially detected, the process in step 204 confirms that the item is still present. The purpose of step 204 is explained later herein. If an item is detected in step 204 as still present, then the process moves to step 210 at which point the optical code reader 110 attempts to read the optical symbol presumably affixed to the item. The reading of the optical symbol may be accomplished using any of a number of algorithms and techniques well known to those skilled in the art, such as those described in U.S. Pat. Nos. 4,879,456 and 5,144,118, each of which is hereby incorporated by reference as if set forth fully herein.

At step 220, which is performed after or simultaneous to step 210, the optical code reader 110 measures dimensions of elements within the symbol read. These measurements can be expressed in absolute dimensional terms, or in relative terms in relation to other elements within the symbol. For example, in a Universal Product Code (UPC) label, as defined in the UPC Specification Manual (published by the Uniform Code Council Inc.), each character of a bar code is defined to be 7 modules in width. The bars and spaces comprising the bar code are each 1, 2, 3 or 4 modules in width, depending on the both location of the bar or space in the label and the data content of the label. The UPC label also comprises guard bars and a center band which comprise bars and spaces each 1 module wide. The UPC label also comprises a white margin at each end of the label that is at least 9 modules wide. Further information regarding UPC labels and bar code characteristics may be found in, for example, U.S. Pat. No. 5,493,108, hereby incorporated by reference as if set forth fully herein.

As part of step 220, the optical code reader 110 performs a number of measurements to characterize the quality of a read symbol. If the symbol is a UPC label, then several different types of measurements can be made. The ANSI standard X3.182 1990 defines a decodability classification scheme for several types of bar codes, and the UPC Symbol Specification Manual defines a similar scheme for measuring the decodability of UPC characters.

Figure 11:
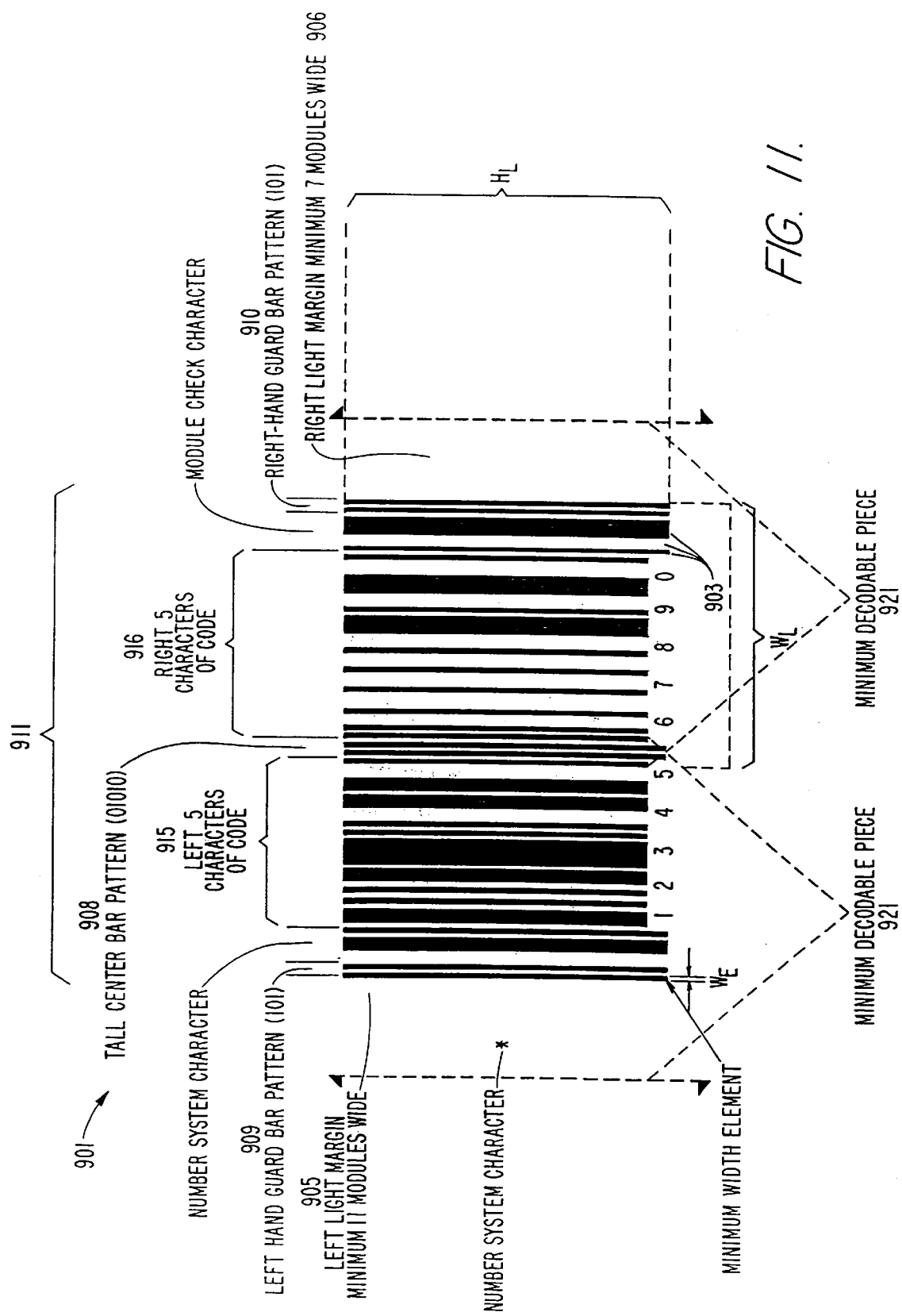
FIG. 11 is an illustration of a bar code.
Figure 12:
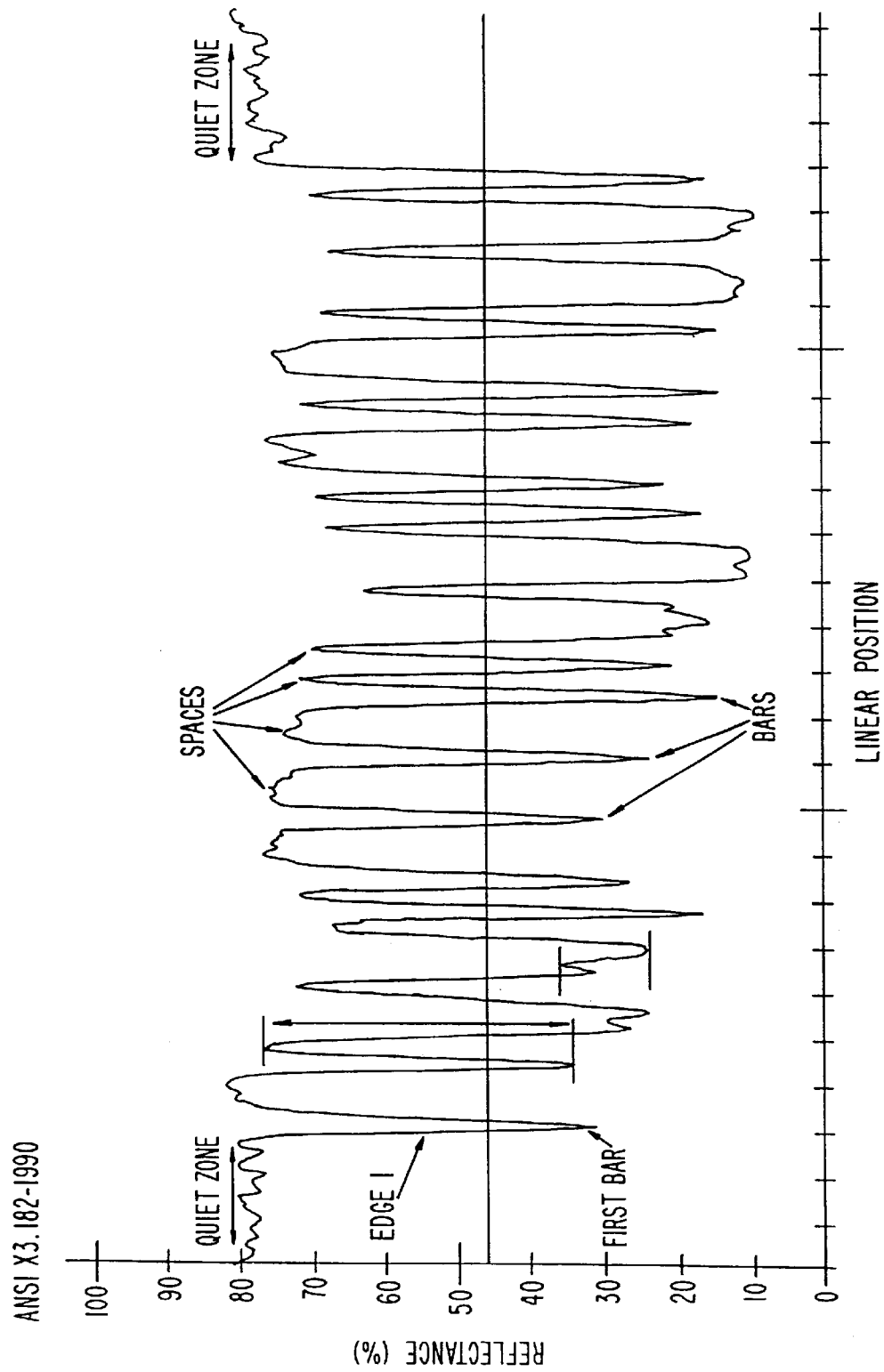
FIG. 12 is a graph of an exemplary output signal generated from reading a bar code.

An exemplary bar code 901 is shown in FIG. 11. In FIG. 11, a bar code 901 comprises a collection of elements 903, each defined in terms of a discrete number of modules. A minimum elements width $W_E$ is typically defined, and is shown in FIG. 11. The bar code 901 comprises a left margin 905 (usually white), a left guard band 909, a left series of characters 915, a center band 908, a right series of characters 916, a right guard band 910, and a right margin 906. An exemplary signal generated from reading a bar code (not necessarily the same bar code as bar code 901 of FIG. 11) is shown in FIG. 12. The signal comprises features that can be identified as corresponding to bars and spaces of a bar code, according to any of a number of detection techniques as known in the art.

As specific examples of the types of measurements that can be made, the optical code reader 110 may measure the width of the white margins 905, 906, and classify the white margin 905, 906 as being either in compliance with the specification (i.e., at least 9 modules wide) or not in compliance. The optical code reader 110 may also measure the widths of the guard band elements 909, 910, center band elements 908, and data character elements 915, 916, and classify these by their deviation from the nominal dimensions. Of these measurements, the measurements of the dimensions of elements within the data characters 915, 916 are considered the most important for determining the readability of the optical symbol.

At step 230, which may be performed after step 220 or in parallel therewith, optical characteristics of the symbol being read are measured and classified by the optical code reader 110. Characteristics which may be measured include the contrast between the light and dark areas in a two level optical code symbol, and variations in the reflectivity from place to place within the symbol for areas which should ideally be at the same level of reflectivity. ANSI X3.182 describes typical measurements which may be made relating to the optical characteristics of an optical symbol.

At step 240, which is performed concurrently with steps 210, 220 and 230, certain events occurring during the reading and decoding process are observed, measured, and stored. Typically, a symbol is presented to the optical code reader 110 for a period of time long enough for the optical code reader 110 to capture many scans or reads of the item, which allows the optical code reader 110 to develop useful statistical data about the readability of the item. The readability measurement function block 154 monitors the activity of the decoder 152, and stores statistical and other information relating to the reading process.

While the type of information to be stored may vary depending upon the level of monitoring desired and the nature of the optical codes being read, in an illustrative embodiment the readability measuring function block 154 measures and stores the following information: (a) the number of scans needed before enough good data was acquired to read the symbol, (b) the number of times that the apparent content of the data varied from the data value finally accepted as a good read, (c) the time needed to read the symbol (which is generally proportional to the number of scans needed to read the label for a reader with a fixed scan rate), and (d) the number of symbol fragments observed before successfully reading the symbol. In optical codes employing error correcting codes (such as the Reed-Soloman error correction codes), the number of errors corrected can also be measured and stored by the readability measurement function block 154, as an indication of label readability.

To perform the above measurements, the readability measurement function block 154 preferably interacts with the optical reading portion 150 and the decoding portion 152 to acquire and generate the readability measurement information. To keep track of the number of scans or reads needed before enough good data was acquired to read the symbol, the readability measurement function block 154 preferably includes a means for counting the number of scans carried out by the optical reading portion 150 for a given symbol, and a signal from the decoding portion indicating a valid symbol decode. When the valid symbol decode signal indicates a the presence of a successfully read valid symbol, the counting means stops counting the number of scans.

To determine the number of times that the apparent content of the data varied from the data value finally accepted as a good read, the readability measurement function block 154 preferably comprises a memory (such as memory 162, or memory and accumulator 159) in which is stored the result from each decoding attempt of the decoding portion 152 (including an indication of invalid or non-recognizable data). When the valid symbol decode signal is received from the decoding portion 152, the readability measurement function block 154 compares each of the stored results against the read symbol, and totals how many of the stored results do not match all or a part of the read symbol.

To determine the time needed to read the symbol, the readability measurement function block 154 may use an internal timer to time from the start of the read until a valid symbol is successfully read, or may use the system clock and count the number of clock cycles, or alternatively compare the start and ending times (if a global time is kept). Alternatively, the readability measurement function block 154 may count the number of scans from the optical reading portion (which it may do anyway to keep track of the number of scans needed before a good read occurs), and arrive at a value for the time needed to read a symbol by multiplying the number of scans by the scan rate, assuming the optical code reader 110 has an optical reading portion 150 with a fixed scan rate.

To determine the number of symbol fragments observed before successfully reading the symbol, the readability measurement function block 154 keeps track of the number of reads resulting in valid data recognized by the decoding portion 152, yet which do not provide enough data to arrive at a complete symbol read. To keep track of the various symbol fragments as they are read, the readability measurement function block 154 may store an identifier with each set of data sent from the optical reading portion 150 to the decoding portion 152. The fragments along with their identifiers and any pertinent statistical information, as derived by the readability measurement function block 154, may be stored in the memory and accumulator 159. Each stream of data (including that which is later to be determined to represent a symbol fragment) may be stored into the accumulator and memory 159 in real time as it is transferred to the decoding portion 152 from the optical reading portion 150. Each stream of data or fragment that is used in arriving at the final symbol may be marked by the decoding portion 152, so that the readability measurement function block 154 can make statistical calculations relating to such information, as detailed above.

While steps 210, 220, 230 and 240 appear in a particular order as shown in FIG. 2, these steps 210, 220, 230 and 240 could be performed in a different order, or in parallel if desired. In particular, step 240 is preferably performed in parallel with the other steps 210, 220 and 230 as information needed by step 240 becomes available.

At step 250, the process checks to see if a valid symbol was successfully read. To this end, the readability measurement function block 154 checks a predefined signal from the decoding portion 152, such as a valid symbol decode signal. If the label was successfully read, control passes to step 260, where the symbol data and the measured values are transferred via interface 160 to the measurement data accumulation and report generation apparatus 100. Control then passes to step 270, wherein the optical code reader 110 waits until the item which has just been read is removed from the field of view of the optical code reader 100. Control then returns to step 202, to await the next item to be read. For the next item, similar steps are carried out.

If, however, at step 250 the label was not successfully read, control passes to step 204 instead of step 260. If at step 204 the item is still present, control passes to step 210 for further attempts to read and measure the symbol. If, instead, the item is no longer present, control passes to step 206. In step 206, the measured data for the item is discarded, and a non-read message is sent from the optical code reader 110 via interface 160 to the measurement data accumulation and report generation apparatus 100. Control then passes to step 202 to await the next item to be read.

Optionally, further information may be collected by the readability measurement function block 154, including a measured optical contrast between the lighter and darker portions of the read symbol, and a measured deviation of the elements of the symbol from the proper size of elements as defined for the particular symbology. In such a case, additional measurement apparatus can be included in the optical code readers 110 which is not necessarily needed or used in standard optical code readers. Such additional measurement apparatus may include means for measuring and quantifying the symbol optical contrast and signal modulation levels, as defined in American National Standards Institute (ANSI) standard X3.182 1990.

Each time an optical code reader 110 reads a symbol, or detects the presence of an item without successfully reading a symbol, the optical code reader 110 sends readability measurement information in the form of a data record to the measurement data accumulation and report generation apparatus 100. As exemplary data record 601 for such a purpose is shown in FIG. 6. The FIG. 6 data record 601 comprises a symbol data field 602, a reader identification (or, alternatively, lane identification) field 603, an operator identification field 604, an optical contrast value field 605, an over/underprint value field 606, a quite zone OK flag 607, a modulation value field 608, a character decodability field 609, a capture rate field 610, a read time field 611, and a data variation field 612. In a preferred embodiment, the symbol data field 602 is 13 digits in length, the reader identification field (or lane identification field) 603 is 3 digits in length, the operator identification field 604 is 4 digits in length, the optical contrast value field 605 is 3 digits in length, the over/underprint value field 606 is 3 digits in length, the quite zone OK flag 607 is 1 character, the modulation value field 608 is 3 digits in length, the character decodability field 609 is 1 character, the capture rate field 610 is 3 digits in length, the read time field 611 is 3 digits in length, and a data variation field 612 is 3 digits in length.

An alternative data record format is depicted in FIG. 7. In FIG. 7, a data record 701 comprises a symbol data field 702, a reader identification (or, alternatively, lane identification) field 703, an operator identification field 704, a number of times read field 705 (representing the number of times that the symbol was read), an average optical contrast value field 706, a number of non-standard optical contrast measurements field 707 (representing the number of times that the optical contrast was not within specifications), an over/underprint value field 708, a number of non-standard over/underprint measurements field 709 (representing the number of times that the over/underprint was not within specifications), a number of non-standard quiet zone measurements field 710 (representing the number of times that the quite zone was not within specifications), an average modulation value field 711, a number of non-standard modulation measurements field 712 (representing the number of times that the modulation was not within specifications), an average character decodability field 713, a number of non-standard decodability measurements field 714 (representing the number of times that the decodability was not within specifications), an average capture rate field 715, a number of non-standard capture rate measurements field 716 (representing the number of times that the capture rate was not within specifications), an average read time field 717, a number of non-standard read time measurements field 718 (representing the number of times that the read time was not within specifications), an average data variation field 719, and a number of non-standard data variation measurements field 720 (representing the number of times that the data variation was not within specifications).

In a preferred embodiment of the FIG. 7 data record, the symbol data field 702 is 13 digits in length, the reader identification field (or lane identification field) 703 is 3 digits in length, the operator identification field 704 is 4 digits in length, the number of times read field 705 is 6 digits in length, the average optical contrast value field 706 is 3 digits in length, the number of non-standard optical contrast measurements field 707 is 6 digits in length, the over/underprint value field 708 is 3 digits in length, the number of non-standard over/underprint measurements field 709 is 6 digits in length, the number of non-standard quiet zone measurements field 710 is 6 digits in length, the average modulation value field 711 is 3 digits in length, the number of non-standard modulation measurements field 712 is 6 digits in length, the average character decodability field 713 is 3 digits in length, the number of non-standard decodability measurements field 714 is 6 digits in length, the average capture rate field 715 is 3 digits in length, the number of non-standard capture rate measurements field 716 is 6 digits in length, the average read time field 717 is 4 digits in length, the number of non-standard read time measurements field 718 is 6 digits in length, the average data variation field 719 is 3 digits in length, and the number of non-standard data variation measurements field 720 is 6 digits in length.

FIG. 3 shows a simple process flow for data record processing. In a first step 305 of the FIG. 3 chart, a data record is compiled at the readability measurement function block 154. In a next step 308, the data record is sent over interface 160 from the optical coded reader 110. In the next step 310, the data record is received at the measurement data accumulation and report generation apparatus 100. In the next step 320, the measurement data accumulation and report generation apparatus 100 appends the new data record to the memory store containing records in the format similar to that shown in FIG. 6. If reader identification or operator identification information is being used, it is included in the record. The reader identification information is included either explicitly or implicitly (by the sending device address) in the record sent from the optical code reader 110 to the measurement data accumulation and report generation apparatus 100.

If data records are being accumulated in the alternate form shown in FIG. 7, then upon receiving each measurement record from the optical code reader 110, measurement data accumulation and report generation apparatus 100 finds and updates a summary record in its memory corresponding to the received data record, or creates a new summary record if no matching summary record is found. A matching summary record must have identical symbol data (i.e., UPC/EAN number from symbol data field 702), reader or lane ID number (from reader identification field 703), and operator ID number (from operator identification field 704). If a matching summary record is found, the record is updated by incrementing the counters for the number of times that item has been read, testing the measured values in the new reader record and updating the counters for the number of times that a measured parameter was out of specification, and computing and updating the average values for the various measured values.

The record format 701 of FIG. 7 has the advantage of reducing the amount of data accumulation memory needed in a deployed system where large quantities of identical items are being read by a small group of operators, such as in a grocery store. However, the FIG. 7 record format 101 generally requires that the measurement data accumulation and report generation apparatus 100 have data processing capability fast enough to search for and update an existing summary record when a new summary record is received (assuming it finds a matching symbol content, reader ID number, and operator ID number), or to create a new summary record if no matching summary record was found.

For unsuccessful reading attempts, a separate group of non-read records may be maintained by the measurement data accumulation and report generation apparatus 100. An exemplary data record format for such a purpose is depicted in FIG. 8. In FIG. 8, a data record 801 comprises a symbol data field 802, a reader identification (or, alternatively, lane identification) field 803, and an operator identification field 804. In a preferred embodiment using the FIG. 8 data record, the symbol data field 802 is 13 digits in length, the reader identification field (or lane identification field) 803 is 3 digits in length, and the operator identification field 804 is 4 digits in length.

In a preferred embodiment, as shown in FIG. 12, the measurement data accumulation and report generation apparatus 100 consists of a programmed general purpose computer 805, including a report generation function block 826. The report generation function block 826 preferably comprises a software program that is set to run periodically (e.g., once per week). The report can be printed or displayed locally, or the report can be transmitted to another site (such as a central office).

The accumulated data records received and stored in the measurement data accumulation and report generation apparatus 100 may be analyzed in a variety of manners. An exemplary process for analyzing accumulated data records is illustrated in the flow chart of FIG. 5. The FIG. 5 process generally analyzes and reports on readability problems according to the most problematic product labels, optical code readers, and operators. The FIG. 5 process results in a report such as shown in FIG. 9, which is divided according to readability problems on a product label basis, optical code reader basis, and operator basis.

Figure 5:
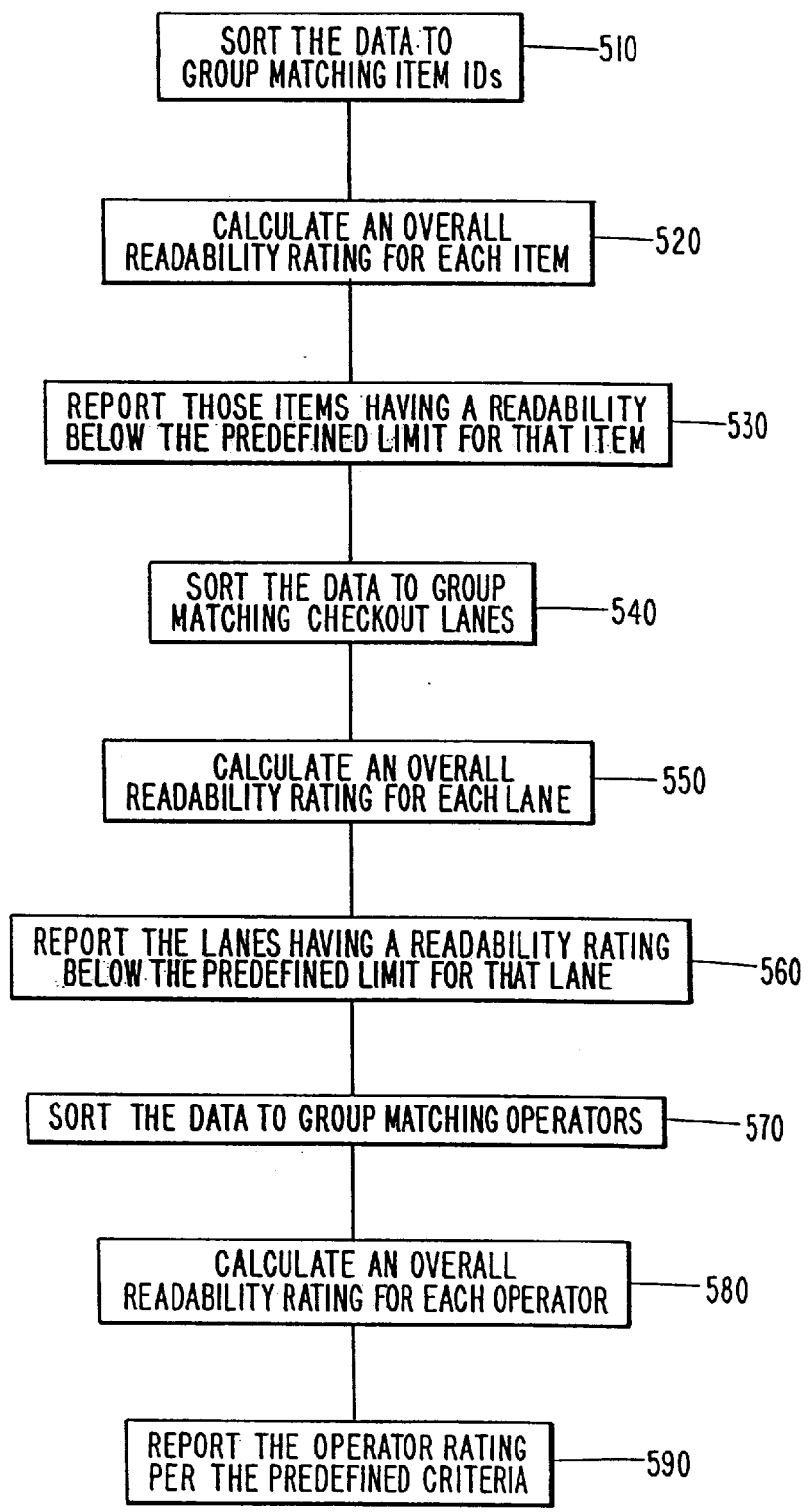
FIG. 5 is a flow chart showing an exemplary process of analyzing the accumulated readability data and reporting the results in accordance with one or more aspects of the present invention.

In the FIG. 5 process, in a first step 510, the stored data records are sorted in the measurement data accumulation and report generation apparatus 100 by matching symbol data fields 601 (or 701, if the FIG. 7 record format is used), thus grouping together data records pertaining to the same item into a set of data records. In a readability monitoring system deployed in a grocery store, for example, the records could be sorted by UPC/EAN number.

In a next step 520, for each set of data records corresponding to the same item, an overall readability rating is calculated. In the preferred embodiment, the readability rating ranges from 0 (very difficult to read) to 100 (very easy to read). The rating is calculated from a weighted average of the readability measurements from the data record shown in FIG. 6 (or FIG. 7). A variety of methods may be used to produce a readability rating from the accumulated measured data. Examples of such methods include the use of fuzzy logic techniques to produce a readability value from the measurement data, and then "defuzzifying" the readability value, or alternatively using a neural network which has been trained using known symbols of known quality. If the data record format of FIG. 7 is used, then the data sorting and analysis steps preferably make use of the partially processed data of FIG. 7 (e.g., the pre-calculated average values and pre-counted number of times certain events have occurred).

In a following step 530, a first part of the FIG. 9 report is generated for those items having a readability below that of a predefined limit. The predefined limit may be a single readability limit value, or alternatively a readability limit value defined on an item-by-item basis. The content of the report may be controlled by user-defined parameters. The exemplary report format of FIG. 9 reports the worst 1% of the UPC/EAN labels (or other symbol codes). The arrangement and content of the report can easily be customized to suit the preferences of the users of the report, but a typical report would generally at least identify items marked with optical code symbols below a target quality level. The report can include only those items with quality problems, or instead could list some or all items with an indication of the quality level, and may further include an indication of the items falling into various quality levels. The number of times each symbol data value was read during the reporting period is preferably included in the FIG. 9 report, to help estimate the statistical significance of the results. In an alternative implementation, reporting could be suppressed for items with a small number of reads, to simplify use of the report.

If different UPC/EAN codes are used for items with codes printed and labelled in-store (as opposed to, e.g., by an outside supplier or manufacturer), then the reporting program is preferably programmed to know which UPC number system digit value and/or which EAN flag numbers are used for in-store printed items and what in-store item numbers are from which department within the store. For those items, the measurement data accumulation and report generation apparatus 100 produces an in-store item report as shown in FIG. 9 either preceding or following the report for all printed items. If data records from multiple stores have been consolidated at the measurement data accumulation and report generation apparatus 100 before generating the report, the in-store item report can be generated and reported separately for each store (assuming local printing equipment is available in each store). Labels other than in-store printed labels are preferably sorted by manufacturer number, to facilitate feedback to each supplier of items.

The report may list the symbols printed by different in-store label printers (such as in-store printers 130 and 132 of FIG. 1) separately as in the sample report format of FIG. 9 separately, to allow identification of which in-store label printers are having printing problems and thereby permit timely maintenance of the label printing equipment.

While running a report generation once per week may be sufficient to monitor readability problems associated with printing equipment, if desired the reporting program could be run more frequently on the in-store printed items, to detect in-store label printing problems promptly. In general, in-store printed labels tend to have worse quality than labels printed by outside suppliers and manufacturers, and are generally the most easily improved by prompt action.

After reporting on readability problems of particular items, the FIG. 5 process continues on to report on readability problems for particular optical code readers and operators. In a step 540 following step 530, the data records are sorted into sets of data records so as to group records by reader number (stored in reader identification field 603 or 703). For example, items read by optical code reader 110a would be associated with one set of data records, items read by optical code reader 110b would be associated with a next set of data records, and so on.

In a next step 550, an overall readability rating is calculated for each optical code reader 110, similar to the calculation done in step 520. In addition to using the information accumulated in the records shown in FIG. 6, the non-read records of FIG. 8 can be used to detect problems in the reader which can degrade performance, such as excessive electrical or optical noise which can cause the optical code reader 110 to be unsuccessful in reading a label. In a next step 560, a portion of a report for optical code reader performance is generated such as shown in the FIG. 9 report format.

In a preferred embodiment, the report includes those optical code readers 110 whose performance has changed from the previously measured performance by an amount greater than some user selectable threshold value. Thus, the FIG. 9 report shows (e.g., in a "Comments" section) the previously measured readability of the optical code readers 110 being reported on, or alternatively notes the store average so as to allow a comparison with the readability performance of the particular optical code reader 110 with the store average. The report also includes a listing of optical code readers 110 whose performance is below some selectable threshold value. The listing can be based on the average performance of all optical code readers 110 in the store (or group of stores), or on some fixed value. In other words, the listing can comprise those optical code readers 110 whose performance falls within a certain relative margin (e.g., the worst performing 25% of optical code readers), or can comprise those optical code readers 110 whose performance falls below a predefined threshold (so that, for example, no optical code readers will appear on the listing if none perform below the threshold, and all the optical code readers will appear on the listing if all perform below the threshold).

In an alternative embodiment, tables listing the expected performance of various models of optical code readers 110 and the model of optical code reader 110 installed in the store lanes can be made available to the reporting program, and used to adjust the threshold for reporting poor performance based on the expected performance level of the particular model of optical code reader 110 installed in a given lane. For example, if a store uses both an older model optical code reader 110 and a newer model optical code reader 110, and the newer model optical code reader 110 is expected to have a performance level ten percent better than the older model optical code readers 110, then the threshold value for reporting poor optical code reader performance would be set differently for checkout lanes with the newer model optical code reader 110, as compared to the threshold setting used for lanes with the old model optical code reader 110. Using different threshold values increases the likelihood that any decrease in performance of optical code readers 110 is reported and corrected, even if the operator might not notice a readability problem because a sub-par newer model optical code reader 110 might actually be working better than an average-performing older model optical code reader 110.

After reporting on readability problems according to product and optical code reader, in a next step 570 the data records are sorted into sets of data records according to operator identification number (such as found in operator identification field 604 or 704). In a following step 580, an overall readability rating is calculated for each operator (e.g., checker), similar to the readability rating process described with respect to steps 520 and 550. As described for step 550, the non-read records of FIG. 8 can be used in the readability calculation for operators. An excessive number of non-reads, or poor results as indicated by the measurements stored in the FIG. 6 data records, can indicate that the operator is not presenting the item to the optical code reader 110 correctly.

In a following step 590, a portion of a report for operator performance is generated such as shown in the FIG. 9 report format. The report can indicate significant increases or decreases in operator performance, and operator performance which is outside of predefined limits. Alternately, or in addition to the report show in FIG. 9, the performance of all operators can be reported, allowing the performance of each operator to be tracked.

While report generation has been described in a preferred embodiment as being carried out by the measurement data accumulation and report generation apparatus 100, alternatively report generation can be performed by a point of sale system controller 120. Likewise, the measurement data accumulation function can also be performed by the point of sale system controller 120, as opposed to the measurement data accumulation and report generation apparatus 100. In such a case, data records pertaining to a measurement of readability are sent to the point of sale system controller 120 through the interface 142 shown in FIG. 1.

Automation provided by the preferred apparatus and method may provide various benefits including minimization or elimination of the problem of operator subjectivity in determining whether a symbol reading problem exists and the seriousness and nature of any perceived symbol reading problem. By integrating the readability measurement with the normal symbol reading process, an additional reading procedure used solely for the purposes of testing is not needed, saving time and expense. The final classification process to determine symbol quality and reader performance is deferred until measurements from many label reads are available, thereby allowing averaging over many reads and reducing or eliminating such potential variance factors as the variation in apparent readability due to the uncontrolled presentation by the operator of the symbols to the reading equipment, variation between different reading devices, and variation between the reading technique of different operators.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. Apparatus for monitoring readability of symbols, comprising:
   an optical code reader comprising
      an optical data collector;
      a decoder connected to said optical data collector;
      a memory:
      a readability measurement block connected to at least one of said optical data collector and said decoder, whereby information relating to an attempt to read an optical code is recorded in said memory; and
   a measurement data accumulator connected to said optical code reader, said measurement data accumulator receiving said information from said optical code reader and generating statistical information based on attempts by said optical code reader to read a plurality of different optical codes.

2. The apparatus of claim 1 wherein said information received by said measurement data accumulator from said optical code reader comprises one or more of a measurement of number of reads needed before enough acceptable data was acquired to read an optical code, a measurement of a number of times that an apparent content of read data varied from a data value accepted as a good read, a measurement of time needed to read said optical code, and a measurement of a number of symbol fragments read before successfully reading said optical code.

3. The apparatus of claim 1 further comprising a report generator integral with said measurement data accumulator.

4. The apparatus of claim 1 wherein said readability measurements comprise dimensional measurements of elements of an optical code read by said optical code reader.

5. The apparatus of claim 4 wherein said readability measurements further comprise one or more of dimensional measurements of guard band elements of said optical code, center band elements of said optical code, and margins of said optical code.

6. A system for monitoring symbol readability, comprising:
   a plurality of optical readers, each of said optical readers comprising a decoder and means for obtaining readability measurements when an attempt to read a symbol is made; and
   a data accumulator, wherein said data accumulator is connected to all of said of optical readers, said data accumulator comprising a memory for storing readability measurements obtained by said optical readers automatically for each attempt to read a symbol, and for aggregating said readability measurements.

7. The system of claim 6 wherein said data accumulator comprises a plurality of summary records stored in said memory, one summary record for each of a plurality of symbol types, the summary record for a particular symbol type being updated when said data accumulator receives readability measurements from any of said of optical readers.

8. The system of claim 7 wherein each of said symbol types corresponds to unique one of a plurality of symbol values said symbol values being used by said data accumulator to distinguish said summary records for different symbol types.

9. The system of claim 8 wherein each of said symbol types further corresponds to either a particular optical reader or a particular operator of said optical readers.

10. The system of claim 6 wherein said data accumulator comprises a plurality of data records stored in said memory for each of a plurality of symbol types, a data record for a particular symbol type being created each time said data accumulator receives readability measurements from any of said of optical readers.

11. The system of claim 10 wherein each of said symbol types corresponds to one of a plurality of symbol values.

12. The system of claim 11 wherein each of said symbol types further corresponds to either a particular optical reader or a particular operator of said optical readers.

13. The system of claim 6 wherein said readability measurements comprise at least one of (i) a number of scans needed to read a symbol, (ii) a number of times that the content of the data read varied from the read symbol, (iii) a length of time needed to read the symbol, and (iv) a number of symbol fragments read before successfully reading the symbol.

14. The system of claim 6 wherein said readability measurements comprise at least one of (i) measurements regarding internal label quality of a read symbol, (ii) measurements regarding optical characteristics of the read symbol, and (iii) a number of errors corrected in reading the symbol.

15. The system of claim 6 wherein said readability measurements comprise dimensional measurements of one or more of guard band elements, center band elements, and data character elements of a read symbol.

16. The system of claim 15 wherein said readability measurements comprise an indication of whether or not margins of a read symbol are in compliance with a standard used to evaluate the read symbol for decodability.

17. The system of claim 6 wherein said data accumulator is located remote from said optical readers.

18. A method for automated monitoring of symbol readability, said method comprising the steps of:

(a) attempting to read an unknown symbol with an optical reader, said symbol being categorized as at least one of a plurality of symbol types;

(b) generating readability data during the attempt to read the symbol;

(c) determining whether the symbol was successfully read;

(d) transferring the readability data from the optical reader to a remotely located data accumulator;

(e) repeating steps (a) through (d) for a plurality of unknown symbols; and (f) aggregating for each of said symbol types the readability data at the remote accumulator.

19. The method of claim 18 further comprising the step of determining an indication of symbol readability for at least one symbol type based on an aggregation of readability data for that symbol type resulting from said step of aggregating the readability data at the remote accumulator.

20. The method of claim 18 wherein each of said symbol types corresponds to one of a plurality of symbol values.

21. The method of claim 20 wherein each of said symbol types further corresponds to either a particular optical reader or a particular operator of said optical readers.

22. The method of claim 18 wherein said step of generating readability data comprises the step of measuring and storing at least one of (i) a number of scans needed to read a symbol, (ii) a number of times that the content of the data read varied from the read symbol, (iii) a length of time needed to read the symbol, and (iv) a number of symbol fragments read before successfully reading the symbol.

23. The method of claim 18 wherein said step of generating readability data comprises the step of measuring and storing at least one of (i) measurements regarding internal label quality of the read symbol, (ii) measurements regarding optical characteristics of the read symbol, and (iii) a number of errors corrected in reading the symbol.

24. The method of claim 18 wherein said step of aggregating the readability data at the remote accumulator for each of said plurality of symbol types comprises the steps of retrieving a summary record associated with a particular symbol type and updating the summary record to reflect the most recent readability data transferred from the optical reader to the data accumulator.

25. The method of claim 18 further comprising the step of generating a data record when said readability data is transferred by the optical reader to the remote data accumulator, wherein said step of aggregating the readability data at the remote accumulator for each of said plurality of symbol types comprises the steps of sorting a plurality of data records to arrive at a set of data records associated with a particular symbol type, and combining information stored in said set of data records to arrive at a summary of readability data for the particular symbol type.

26. The method of claim 18 wherein said step of aggregating the readability data at the remote accumulator for each of said plurality of symbol types comprises the step of aggregating readability data separately for successful symbol reads and unsuccessful symbol reads.

27. The method of claim 18 further comprising the step of identifying readability problems associated with said optical reader based on an assessment of the readability data aggregated at said remote data accumulator, said readability data including an optical reader identifier.

28. The method of claim 18 further comprising the step of identifying readability problems associated with a particular operator of said optical reader based on an assessment of the readability data aggregated at said remote data accumulator, said readability data including an optical reader operator identifier.

* * * * *